(12) United States Patent
Garza et al.

(10) Patent No.: US 10,567,504 B2
(45) Date of Patent: Feb. 18, 2020

(54) PROTECTING IN-FLIGHT TRANSACTION REQUESTS

(71) Applicant: International Business Machines Corporation, Armonk, NY (US)

(72) Inventors: Jose E. Garza, Teddington (GB); Stephen J. Hobson, Hampton (GB)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 15/826,620

(22) Filed: Nov. 29, 2017

(65) Prior Publication Data
US 2019/0166194 A1 May 30, 2019

(51) Int. Cl.
*G06F 15/16* (2006.01)
*H04L 29/08* (2006.01)
*H04L 29/06* (2006.01)

(52) U.S. Cl.
CPC ...... *H04L 67/1095* (2013.01); *H04L 67/2842* (2013.01); *H04L 67/42* (2013.01)

(58) Field of Classification Search
CPC .. H04L 67/1095; H04L 67/2842; H04L 67/42
USPC ........................................................ 709/201
See application file for complete search history.

(56) References Cited

U.S. PATENT DOCUMENTS

| | | | |
|---|---|---|---|
| 8,855,082 B2 | 10/2014 | Grayson et al. | |
| 9,185,180 B2 * | 11/2015 | Ananthakrishnan | ......................... H04L 67/1097 |
| 9,621,399 B1 * | 4/2017 | Parakh | .............. H04L 29/06047 |
| 2009/0193428 A1 | 7/2009 | Dalberg et al. | |
| 2010/0180002 A1 | 7/2010 | Ahmed et al. | |
| 2014/0115188 A1 * | 4/2014 | Prince | ................. H04L 61/6013 709/245 |
| 2017/0187629 A1 | 6/2017 | Shalev et al. | |
| 2018/0253493 A1 * | 9/2018 | Busayarat | ............... H04L 67/02 |

OTHER PUBLICATIONS

Hector Garcia-Molina, et al., Agressive Transmissions over Redundant Paths for Time Critical Messages, Publication date believed to be 1992, pp. 1-44, Stanford University, Published at: http://i.stanford.edu/pub/cstr/reports/cs/tr/92/1431/CS-TR-92-1431.pdf.
Author Unknown, Load Balancing and Fault Tolerance for Transport Servers, Exchange 2007 Help, Article, Nov. 10, 2016, pp. 1-9, Microsoft Corporation, Published at: https://technet.microsoft.com/en-us/library/bb267003(v=exchg.80).aspx.

(Continued)

*Primary Examiner* — Krisna Lim
(74) *Attorney, Agent, or Firm* — Christopher B. Lee; Christopher M. Pignato

(57) ABSTRACT

The subject matter described herein relates to protecting in-flight transaction requests, where a client device is connected via at least two application servers to a backend server device that is capable of processing redundant transaction requests originated by the client device. A first instance of a transaction request identified by a transaction identifier is received at the backend server device. The first instance of the transaction request is processed and a transaction response is sent to the client device. The transaction response identified by the transaction identifier is saved in a cache. If a subsequent instance of the transaction request is received, the cached transaction response is sent to the client device.

20 Claims, 9 Drawing Sheets

(56) References Cited

OTHER PUBLICATIONS

Marc Koerner, et al., Multiple service load-balancing with OpenFlow, Abstract, In Proceedings of 2012 IEEE 13th International Conference on High Performance Switching and Routing, Jun. 24, 2012, pp. 1-3, IEEE, Published at: http://ieeexplore.ieee.org/abstract/document/6260852/.

* cited by examiner

PROTECTING IN-FLIGHT TRANSACTION REQUESTS

BACKGROUND

The present invention relates to transaction availability in application or integration server requests to a backend server, and more specifically relates to protecting in-flight transaction requests.

A large number of clients (for example, browsers or applications on mobile computing devices, tablet computing devices, or personal computers, etc.) send requests to an application or integration server, which in turn accesses a database server for data query and/or update. The database server may be, in general, any backend server.

From a high availability point of view, the database server is usually considered highly available through data replication. That is, the database is mirrored to another site, usually called a disaster recovery (DR) site. A single application/integration server constitutes a single point of failure—if it fails, the whole system becomes unavailable to the clients.

A conventional approach to this availability problem is to provide redundancy of the application/integration server.

In one configuration, a workload balancer distributes requests between two (or more) instances of the application/integration server. This is called an Active-Active configuration; though Active-Passive is also possible. Should one application/integration server instance fail, the other application/integration server instance starts receiving all client requests, so the service remains available.

SUMMARY

According to an aspect of the present invention there is provided a computer-implemented method for protecting in-flight transaction requests at a backend computing server. A processor of a backend server device capable of processing redundant transaction requests, originated by a client device, that are received via one or more of at least two application servers: receives a first instance of a transaction request identified by a transaction identifier; processes the first instance of the transaction request and sends a transaction response to the client device; saves the transaction response identified by the transaction identifier in a cache; and, if a subsequent instance of the transaction request is received, sends the cached transaction response to the client device.

According to another aspect of the present invention there is provided a computer-implemented method for protecting in-flight transaction requests at a computing client. A processor of a client device connected via at least two application servers to a backend server device: sends two or more identical redundant instances of a transaction request, each including a same transaction identifier, with each instance of the transaction request being sent via a different one of the at least two application servers; receives a first instance of a transaction response identified by the transaction identifier; saves the first instance of the transaction response identified by the transaction identifier or a record of the first instance of the transaction response identified by the transaction identifier in a cache; and, if a subsequent instance of the transaction response is received, deletes the received subsequent instance of the transaction response.

Systems that perform the computer-implemented methods and computer program products that cause computers to perform the computer-implemented methods are also described.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In a cloud or network environment where multiple clients are connected via multiple application/integration servers to a backend server, the described methods and systems protect in-flight transaction server requests.

It should be noted that conception of the present subject matter resulted from recognition of certain limitations associated with conventional server availability techniques. For example, while a workload balancer distributes requests between two (or more) instances of the application/integration server, it was observed and recognized that the workload balancer protects the service, but not in-flight transactions. It was further recognized that if a server fails, any in-flight transactions will fail as well. It was observed that a heavily loaded server may process many thousands of transactions per second during peak utilization. Take, for example, a server processing two thousand (2,000) transactions per second, with each transaction taking, on average, two hundred (200) milliseconds (ms). According to Little's Law, which is a Queuing Theory theorem, the number of in-flight transactions will be:

$$L=\lambda W=2000\ s^{-1}*0.2\ s=400$$

Where, L is the number of in-flight transactions, lambda (λ) is the transaction rate, and W is the transaction time. Therefore, in this situation, if a server fails, there may be 400 users that need to re-submit their requests for server-level processing.

The present subject matter improves transaction processing by protecting in-flight transaction requests, as described above and in more detail below. As such, improved real-time transaction request processing throughput may be obtained through use of the technology described herein.

Figure 1:
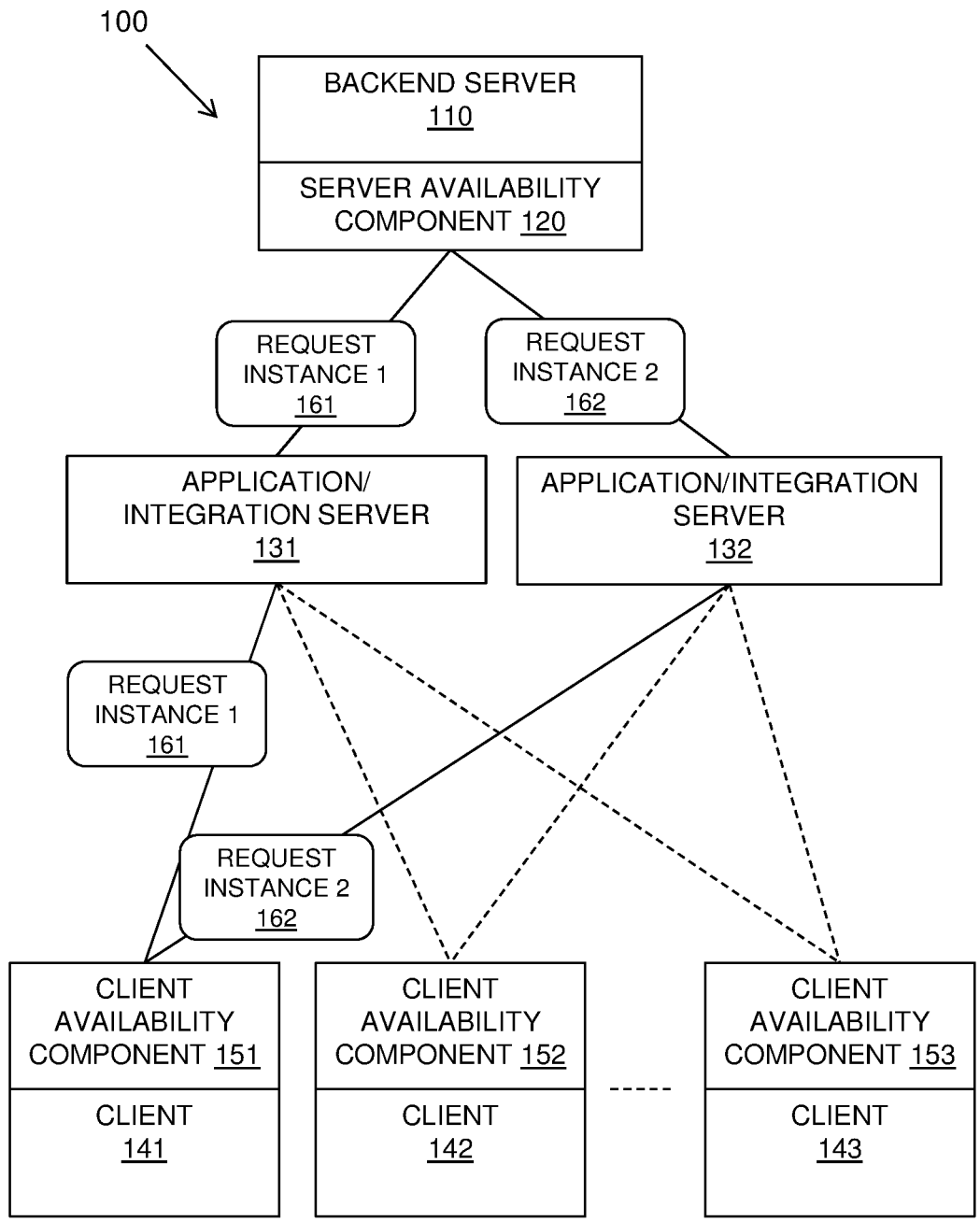
FIG. 1 is a block diagram of an example of an implementation of a transaction system in which the present invention may be implemented.

Referring to FIG. 1, FIG. 1 is a block diagram of an example of an implementation of a transaction system 100 in which a large number of clients devices, represented as clients 141 through 143 (for example, browsers or applications on mobile computing devices, tablet computing devices, personal computers, or other computing devices, etc.), send requests to two or more application or integration server devices, represented as servers 130 through 132, which each in turn accesses a backend server 110 for data query and/or update. The two or more application or integration servers may be identical servers in a server group that provides service redundancy.

An application server may be a component-based product that resides in a middle-tier of a server centric architecture. The application server may provide middleware services for security and state maintenance, along with data access and persistence.

An integration server may be a computer server used to facilitate interaction between a diverse operating system and applications across internal and external networked computer systems. An enterprise integration server may include prepackaged applications, customized applications, and legacy applications.

The backend server 110 may be, in general, any backend server such as a database server. In order to provide high availability, the backend server 110 may be available through data replication. The backend server 110 may be mirrored to another site called a disaster recovery (DR) site (not illustrated). In this description, reference to a backend server 110 may be interpreted as two or more backend servers providing the service.

Two or more application/integration servers 131 through 132 may be redundantly provided to avoid a single point of failure in processing transaction requests. Application/integration servers 130 through 132 are referred to herein generally as application servers, though it should be understood that the term application server(s) as utilized alternatively herein for ease of reference should be interpreted to also include integration server(s).

Conventionally, two application servers are provided to provide redundancy and a workload balancer (not illustrated) may distribute requests between the two instances of the application server. Should one application server instance fail, the other application/integration server instance starts receiving all client requests, so the service remains available.

In the described transaction system 100, two or more identical instances 161 through 162 of a client transaction request may be sent to two or more application servers 131 through 132. The described embodiments use duplicate instances of a client transaction request to two application servers 131 through 132. However, three or more application servers may be used with three or more instances of the client transaction request being sent via each client transaction request to a respective number of the application servers.

In the described transaction system 100, the backend server 110 may include a server availability component 120 to handle the processing of duplicate client request instances 161 and 162. The clients 141 through 143 may each include a respective client availability component 151 through 153 to handle sending and receiving of the two or more identical client request instances 161 through 162.

Figure 2A:
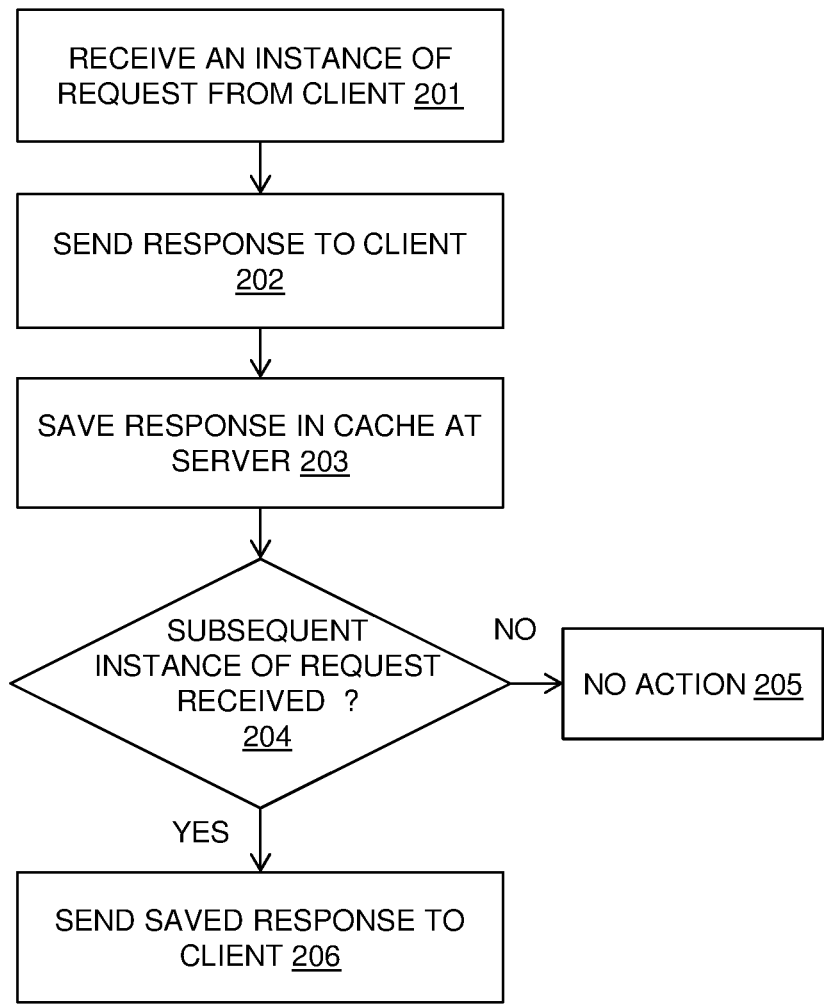
FIG. 2A is a flow diagram of an example of an implementation of a process that may be performed in accordance with the present invention as carried out at a server.

Referring to FIG. 2A, FIG. 2A is a flow diagram of an example of an implementation of a process 200 that shows example processing that may be carried out at a server availability component 120 of a backend server 110.

For purposes of description of the processing of FIG. 2A, and with reference to FIG. 1 as described above, the client availability component 151 of the client 141 sends the first instance 161 of the client transaction request via the first application server 131, and sends the duplicate second instance 162 of the client transaction request via the second application server 132. A further identical third or more instances of the client transaction request may also be sent, if there are additional application servers and additional security for the requests is to be provided within the transaction system 100.

The first instance 161 of the request and the two or more identical instances of the request 162 may be received at different times at the server availability component 120. Further, if there is a failure of one or more of the application servers 131 through 132, one or more of the request instances 161 through 162 may not arrive at the server availability component 120.

With reference to the processing of FIG. 2A, the server availability component 120 may receive 201 a first instance of a transaction request with a transaction identifier from the client 141. The server availability component 120 may pass the request to the backend server 110 for processing and may send 202 a resulting response to the request back to the calling client 141.

The process 200 may save 203 the response with the transaction identifier in a cache at or available to the server availability component 120 of the backend server 110.

It may be determined 204 if a subsequent instance of the same request having the same transaction identifier is received at the server availability component 120. If a subsequent instance of the same request is not received, no action is taken 205. However, if a subsequent instance of the same request is received, instead of processing it, the response that is saved in the cache from processing the first instance of the request may be sent 206 to the calling client 141. Sending multiple responses may provide redundancy during the return flight in case one of the application servers 131 through 132 fails during the return flight of the responses. As such, the technology described herein provides bi-directional transaction and response redundancy.

In one embodiment, three request instances may be sent by the client so that, in the event that one of the application servers fails during delivery of the requests, there are still two requests that have responses sent by the backend server thereby providing redundancy on the response flight via the application servers. Also, three request instances may protect against two application servers failing at the same time. Therefore, the saved response may be sent a third time to provide additional security on the return flight.

Further details of the processing at the server availability component 120 are described with reference to FIG. 2B, including provisions for handling simultaneous arrival of requests at the backend server.

Figure 2B:
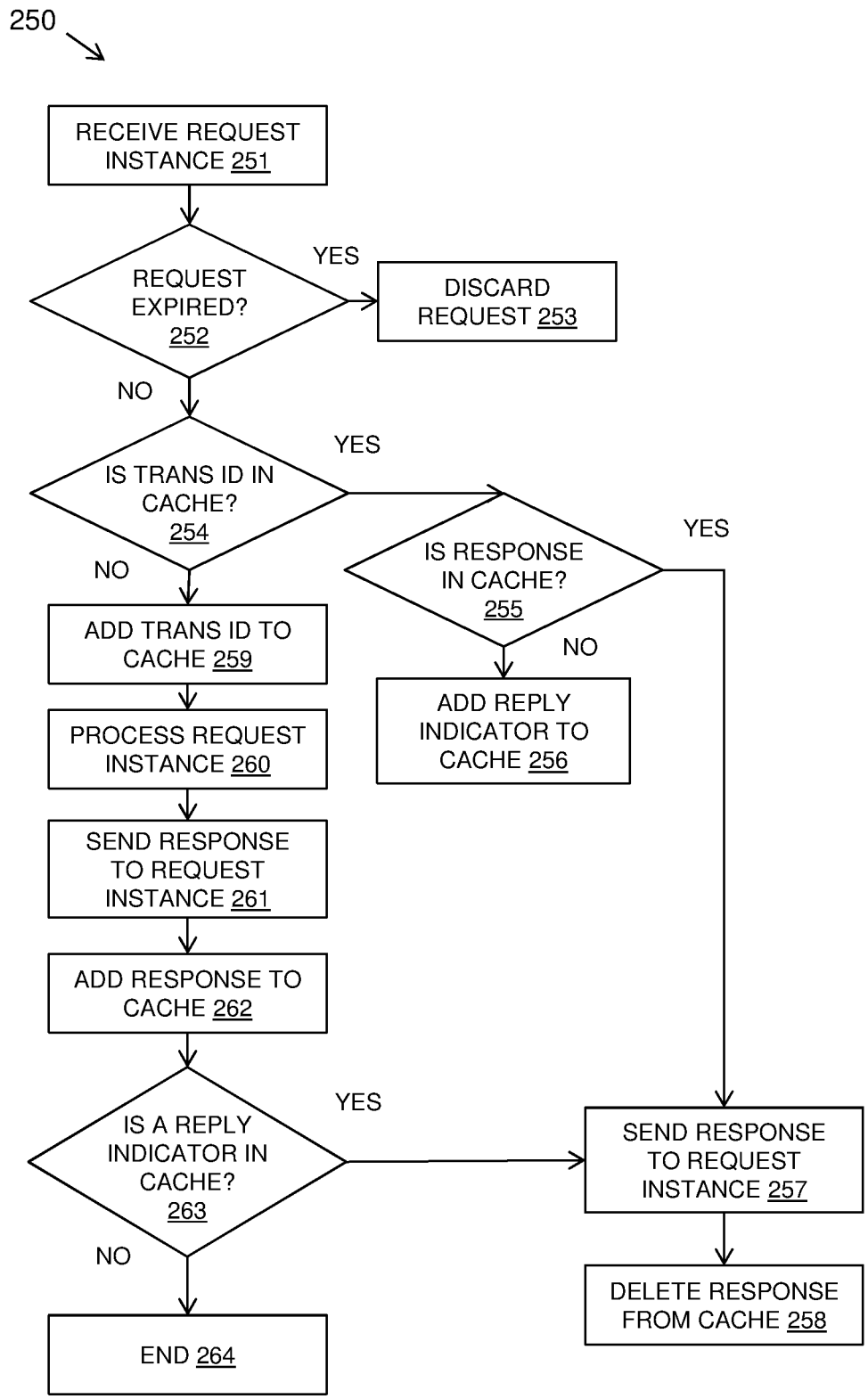
FIG. 2B is a flow diagram of an example of an implementation of a process that shows additional processing that may be implemented in association with the example described with respect to the process of FIG. 2A in accordance with the present invention.

Referring to FIG. 2B, FIG. 2B is a flow diagram of an example of an implementation of a process 250 that shows additional processing that may be implemented in association with the example described above with respect to the process 200 of FIG. 2A, where more detail is provided with respect to two duplicate request instances. The logic of FIG. 2B may be extended to accommodate three or more identical request instances.

A first request instance may be received 251 at the server availability component 120 with a transaction identifier and an expiration time as metadata. It may be determined 252 if the request has expired according to the expiration time. If the request has expired, the request may be discarded 253.

If the expiration time has not expired, it may be determined 254 if the transaction identifier of the request instance is recorded in the cache. The transaction identifier may be recorded in the cache while a request is being processed. If it is determined that the transaction identifier is recorded in the cache, this indicates that the arriving request instance is at least the second request instance to arrive for this transaction identifier.

If it is determined that the transaction identifier is recorded in the cache, it may be determined 255 if a response to the request is already available in the cache. If the transaction identifier is recorded in the cache, but the response is not available in the cache, a reply indicator 256 may be added to the cache. The reply indicator may show that a request instance is waiting for the response to be available from another earlier request instance. This processing avoids both request instances processing the same request, and saves real-time processing, while providing bi-directional transaction and response redundancy.

If the response is available in the cache, the response may be sent 257 to the caller of the request instance. This will be the second response sent as it will have already been sent by the request instance that was processed. Therefore, the response may be deleted 258 from the cache.

Going back to step 254, if it is determined that the transaction identifier is not already recorded in the cache, this indicates that the received request instance 251 is the first instance and the transaction identifier may be added 259 to the cache to inform processing of later instances that the request is being processed.

The request instance may then be processed 260 and the response sent 261 to the caller of the request instance. The response may be added 262 to the cache for sending by later request instances. The response may have a timestamp to determine when it is added to the cache, and the timestamp may be used to delete responses in the cache that are not sent in response to a later request instance, as described below.

It may be determined 263 if there is a reply indicator in the cache when the response is added to the cache. If there is, this indicates that another received request instance is waiting for the response and the response may be sent 257 in response to the waiting request instance. The response may then be deleted 258 from the cache. If there is not a reply indicator in the cache, then the method may end 264.

If one application server is down (e.g., temporarily inoperative, communications disrupted, etc.), a subsequent request instance may never arrive and the corresponding cache entry of the response may never be deleted. To avoid this problem, the server availability component 120 may periodically check the cache for entries (transaction responses) greater than a predefined age and delete them. The predefined age may be determined by the timestamp of when the response was added to the cache and the predefined age may be specified to be older than the transaction expiration time. In response to deleting a cached transaction response, it may be determined that any subsequent instance of the transaction request has not arrived because the response would have otherwise been deleted 258 from the cache responsive to sending 257 the cached transaction response in response to the waiting request instance.

Figure 3:
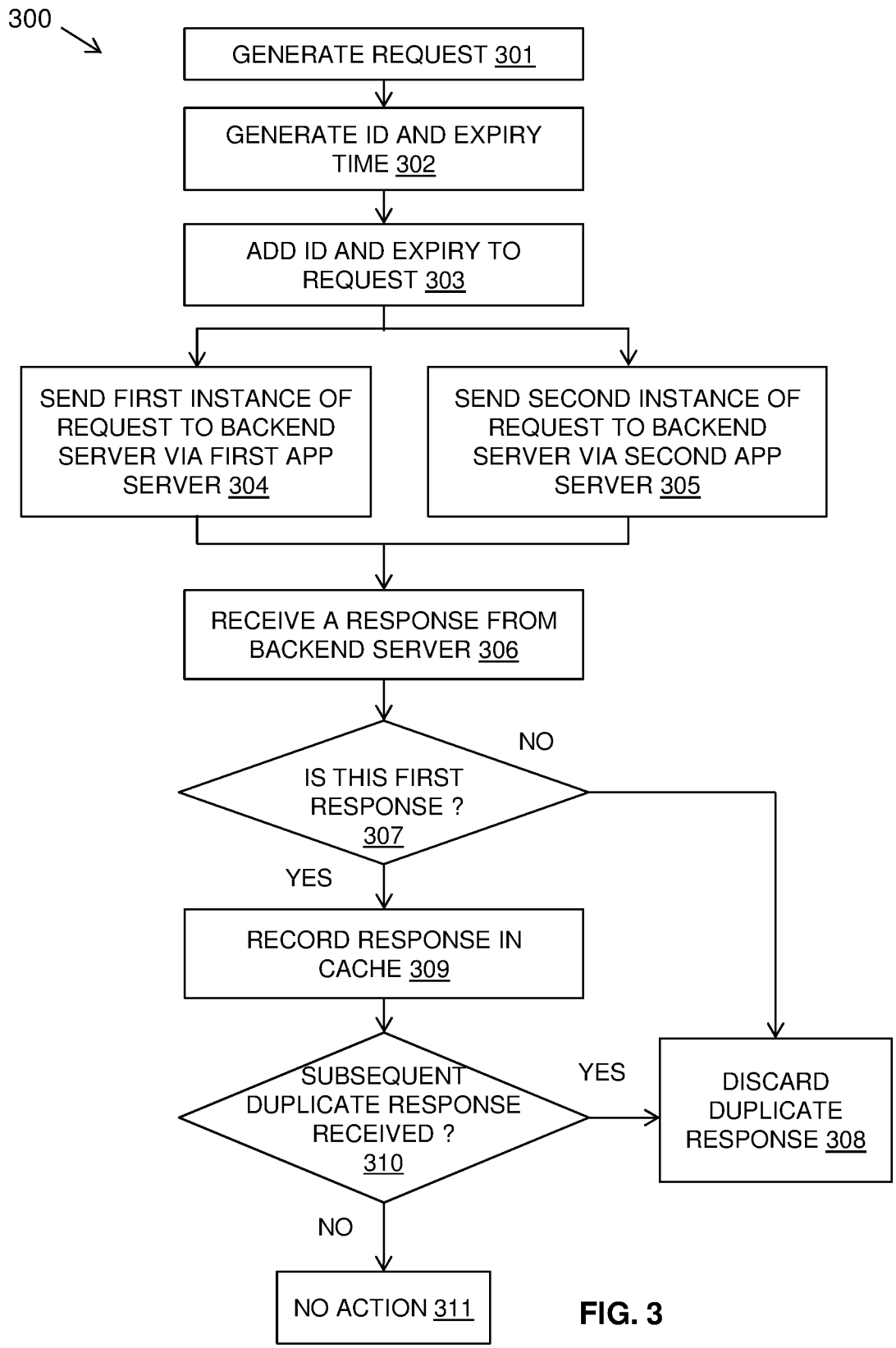
FIG. 3 is a flow diagram of an example of an implementation of a process that may be performed in accordance with the present invention as carried out at a client.

Referring to FIG. 3, FIG. 3 is a flow diagram of an example of an implementation of a process 300 that shows an example of processing that may be carried out at a client availability component, such as the client availability component 151 of the client 141.

The client 141 may generate 301 a transaction request and the client availability component 151 may generate 302 a transaction identifier and an expiration time for the request. The transaction identifier and the expiration time may be added 303 as metadata to the request.

Two or more identical instances (161 through 162) of the request may be sent at 304 through 305, each with the same request metadata of the transaction identifier and the expiration time of the request. Each of the duplicate instances of the request is sent via an application server (e.g., 131 through 132). In this embodiment, duplicate instances of the request are sent: a first instance of the request may be sent 304 via a first application server; and a second instance of the request may be sent 305 via a second application server. As described above, other implementations may use a third or more identical request instances and/or application servers to provide further redundancy of the requests.

A response to the request may be received 306 at the client availability component 151 from the backend server. It may be determined 307 if this is the first response received for the transaction request identified by the transaction identifier. If it is not the first response, it is a subsequent duplicate response and may be discarded 308. This may be determined by checking if there is already a response for this transaction identifier in a cache.

If it is the first response received, it may be recorded 309 in the cache. The recording of the received response may save the response in the cache or may record that a response has been received for the transaction identifier without actually saving the response.

It may then be determined 310 if a subsequent duplicate response is received at a later time. A later received response may include the transaction identifier so that a duplicate response may be recognized. If a second response is received, the second response may be discarded 308. If no subsequent duplicate response is received, for example, due to an application server failure, no action 311 needs to be taken.

A subsequent response may never be received at the client, in which case a response or response record in the cache at the client may be deleted after a predefined time. Responses added to the cache may include a timestamp in order to determine how long they have been in the cache and processing may be performed to delete the responses accordingly.

This section describes a working implementation of the method, implemented as an IBM® Integration Bus (IIB) message flow (IBM® is a trade mark of International Business Machines Corporation). Other implementations are possible.

The client sends the request to both application/integration servers. In more detail, the client generates a unique identifier, which may be a universally unique identifier (UUID) for each request, called Transaction Id (TranId in the pseudo code example, below).

The client calculates an expiration time for each request (ExpiryTime in the pseudo code).

The client adds the unique identifier and expiration time to the request as metadata and sends the request to both servers.

The unique identifier is utilized because the backend server must be able to identify duplicate requests.

The expiration time may be used to discard out of time requests. The expiration time may also be used to define a period after which responses in the cache may be deleted in the event that a duplicate second request does not arrive. If one application server is down, the duplicate request may never arrive. A predefined period significantly greater than the expiration time may allow for safe deletion of old responses.

The following IIB Extended Structured Query Language (ESQL)-like pseudo code implements this:

```
DECLARE TRANID SHARED ROW;                              -- To remember transaction Ids
DECLARE TranId CHARACTER UUIDASCHAR;                    -- Generate a unique Transaction Id
DECLARE timeout INTEGER 180;                            -- Timeout in seconds
DECLARE ExpiryTime TIMESTAMP;
SET ExpiryTime = CURRENT_TIMESTAMP + CAST(timeout AS INTERVAL SECOND);
Set TranId and ExpiryTime in request message header.
Send request to both Integration servers.
```

The backend server processes the first request to arrive from the application/integration servers, responds to the calling application/integration server, and saves the response.

When (if) the second request arrives, instead of processing it, the database server sends the saved response.

When a request arrives to the backend server, the following process (shown as IIB ESQL-like pseudo code) takes place:

First, check if the request has expired.

```
IF CURRENT_TIMESTAMP >= ExpiryTime THEN    -- Did this arrive after expiration time?
    RETURN FALSE;                          -- Yes, discard request (client will timeout)
END IF;
```

Next, check to see if this is the first request to arrive. The method takes into account that two requests may arrive simultaneously and may be processed by two threads in parallel. The logic is as follows:

When a request arrives, if there is no record of this TranId in the cache, it means this thread is the first to see this transaction. Add the TranId and current timestamp to the cache and continue processing this request.

If the TranId is in the cache, it means another thread has started first and is already processing, or has already processed, the transaction.

If there is no associated response, the other thread is still processing the transaction.

Add a Reply Identifier to the cache, so the caller gets the response later and return to caller (the other thread will process this request).

If there is a response in the cache, it means the other thread already sent that response to its caller and the saved response is sent to this caller.

After processing a request and sending a response to the calling server:

If there is no Reply Identifier recorded, it means that the other request has not arrived yet. The response is added to the cache. Another thread can come later and send it.

If another thread recorded its Reply Identifier in the cache, the cached response is sent to the other server.

When the responses arrive at the client, the client discards duplicate responses.

The following ESQL-like pseudo code shows how the client handles responses:

```
IF Response-in-cache IS NOT TRUE THEN    -- First time we see this response
    Pass response to client;
    Record this response in the cache;
ELSE
    -- We already sent one response, clean up
    Clear this response from cache;
    Return;                              -- We already sent one response
END IF;
```

Figure 4:
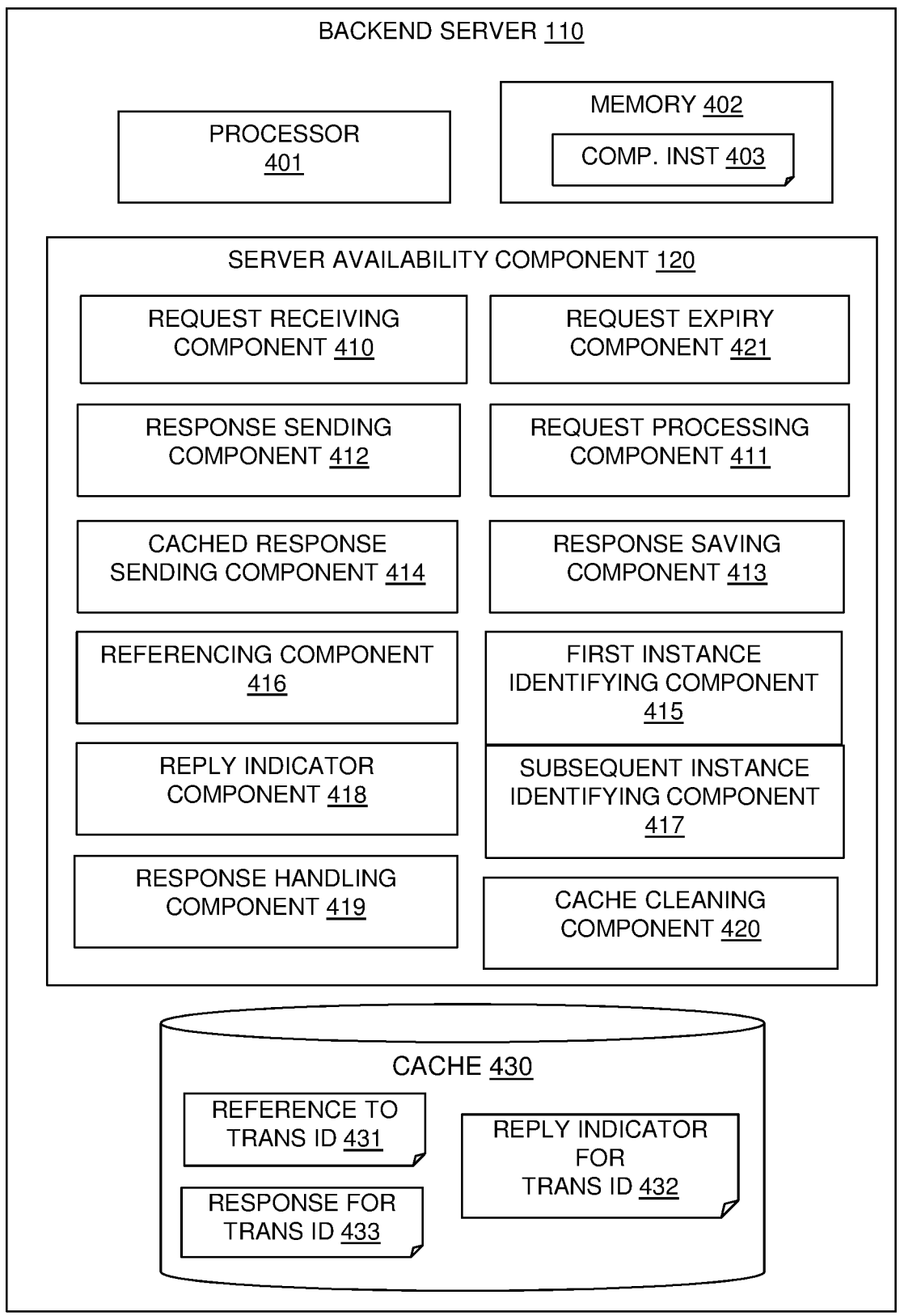
FIG. 4 is block diagram of an example of an implementation of a server device having a server availability component in accordance with the present invention.

Referring to FIG. 4, FIG. 4 is a block diagram of an example of an implementation of a backend server device 110 having a server availability component 120. The backend server 110 may include at least one processor 401, a hardware module, or a circuit for executing the functions of the described components which may be software units executing on the at least one processor. Multiple processors running parallel processing threads may be provided enabling parallel processing of some or all of the functions of the components. A memory 402 may be configured to provide computer instructions 403 to the at least one processor 401 to carry out the functionality of the components.

Multiple clients may be connected via two or more application/integration servers to the backend server 110. A calling client sends duplicate or more identical instances of a transaction request, each instance being sent via one of the application/integration servers.

A server availability component 120 of a backend server 110 may handle the transaction request instances on behalf of the backend server 110, and may include a request receiving component 410 for receiving a first instance of a transaction request identified by a transaction identifier, a request processing component 411 for processing the request using the backend server 110, and a response sending component 412 for sending a response to the calling client. The server availability component 120 may include a request expiry component 421 for determining if the request expiry time provided in metadata of the request instance has expired and discarding a request accordingly.

The server availability component 120 may include or have access to a cache 430 for use in the described system. The cache 430 may store a reference 431 to a transaction identifier, a reply indicator 432 for a transaction identifier, and a response 433 for a transaction identifier as used in the described method.

The server availability component 120 may include a first instance identifying component 415 for identifying a first instance of a transaction request by determining that the transaction identifier for the request is not already referenced in the cache 430. The server availability component 120 may include a subsequent instance identifying component 417 for identifying a subsequent instance of the transaction request by determining that the transaction identifier for the request is already referenced in the cache 430.

The server availability component 120 may include a referencing component 416 for, after receiving a first instance of a transaction request, adding a reference to a transaction identifier 431 in the cache 430 indicating that a request having the transaction identifier is currently being processed.

The server availability component 120 may include a reply indicator component 418 for, after receiving a second instance of the transaction request, providing a reply indicator 432 for a transaction identifier in the cache 430 indicating that the response is to be sent in reply to the second instance when it has been processed for the first instance.

The server availability component 120 may include a response saving component 413 for saving the response 433 in a cache 430 identified by the transaction identifier when the response has been processed for the first instance of the transaction request. The response saving component 413 may also save a timestamp for the response 433 to determine how long the response has been in the cache 430 for the purposes of removing old responses from the cache 430.

The server availability component 120 may include a cached response sending component 414 for, if a second instance of the transaction request is received, sending the cached response to the calling client.

The server availability component 120 may include a response handling component 419 for, after processing the first instance of the transaction request, determining if there is a reply indicator 432 in the cache; and, if there is a reply indicator, the cached response sending component 414 may send the response in reply to the second instance; or, if there is no reply indicator, the response saving component 413 may save the response 433 in the cache 430.

The server availability component 120 may include a cache cleaning component 420 for cleaning responses 433 saved in the cache 430 by deletion of a response after a predefined time period in the cache 430. The timestamp of responses 433 in the cache 430 may be used to determine the age of the responses 433 in the cache 430.

Figure 5:
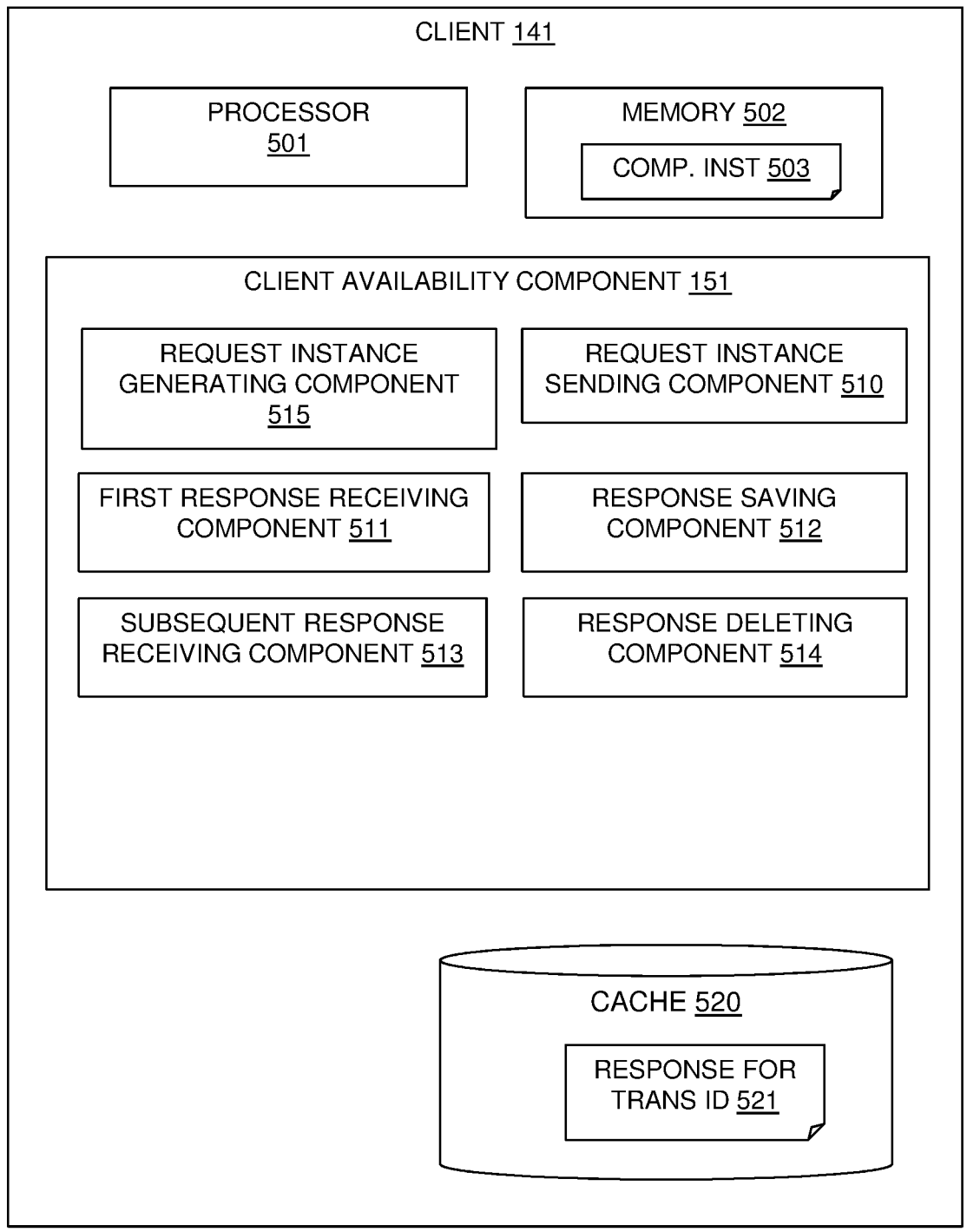
FIG. 5 is block diagram of an example of an implementation of a client device having a client availability component in accordance with the present invention.

Referring to FIG. 5, FIG. 5 is a block diagram of an example of an implementation of a client device 141 having a client availability component 151. The client 141 may include at least one processor 501, a hardware module, or a circuit for executing the functions of the described components which may be software units executing on the at least one processor. Memory 502 may be configured to provide computer instructions 503 to the at least one processor 501 to carry out the functionality of the components.

A client availability component 151 of a client 141 may handle the transaction request instances and responses on behalf of the client 141.

The client availability component 151 may include a request instance generating component 515 for generating two or more identical instances of a transaction request, each instance having the transaction identifier and an expiration time provided as metadata in the request. The request instance generating component 515 may generate two or more identical instances, as appropriate for the preferred redundancy of the system.

The client availability component 151 may include a request instance sending component 510 for sending the two or more identical instances of a transaction request each including the same transaction identifier, each instance being sent via one of the application/integration servers.

The client availability component 151 may include a first response receiving component 511 for receiving a first instance of a transaction response identified by the transaction identifier and a response saving component 512 for saving the response or a record of the response 521 in a cache 520 identified by the transaction identifier. The response or record of the response 521 may include a timestamp when being saved in the cache 520 to enable the client availability component 151 to determine the age of saved responses and to delete these after a predefined time.

The client availability component 151 may include a subsequent response receiving component 513 and a response deleting component 514 for, if a subsequent instance of the response is received, deleting the saved response 521 in the cache 520.

The response deleting component 514 may also delete responses 521 saved in the cache 520 after a predefined time period, after which it is determined that a subsequent instance of the response has not arrived.

Figure 6:
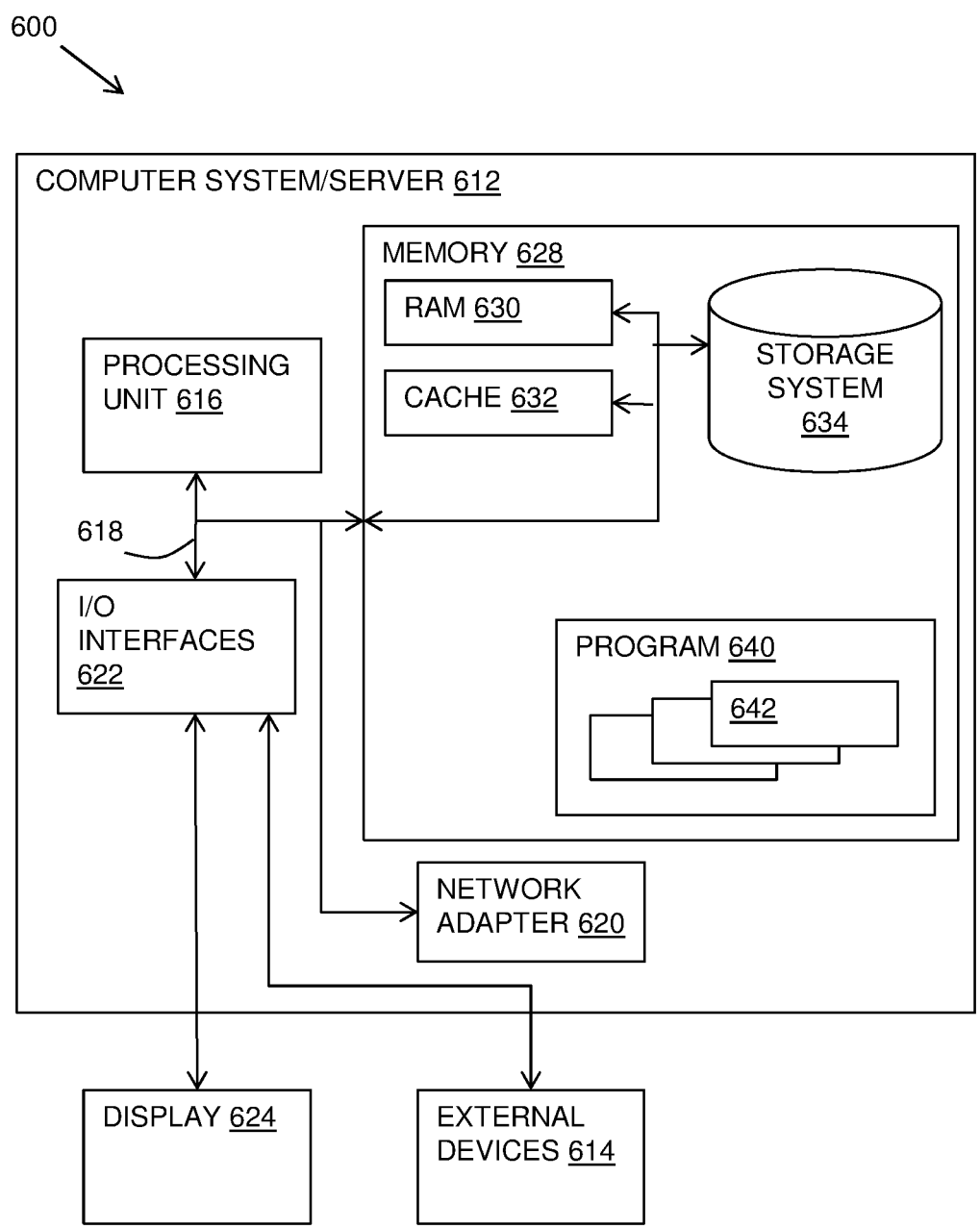
FIG. 6 is a block diagram of a computer system or cloud server in which the present invention may be implemented.

Referring now to FIG. 6, FIG. 6 is a block diagram of an example of a system 600 in the form of a computer system or server that may be used to implement the technology described herein.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
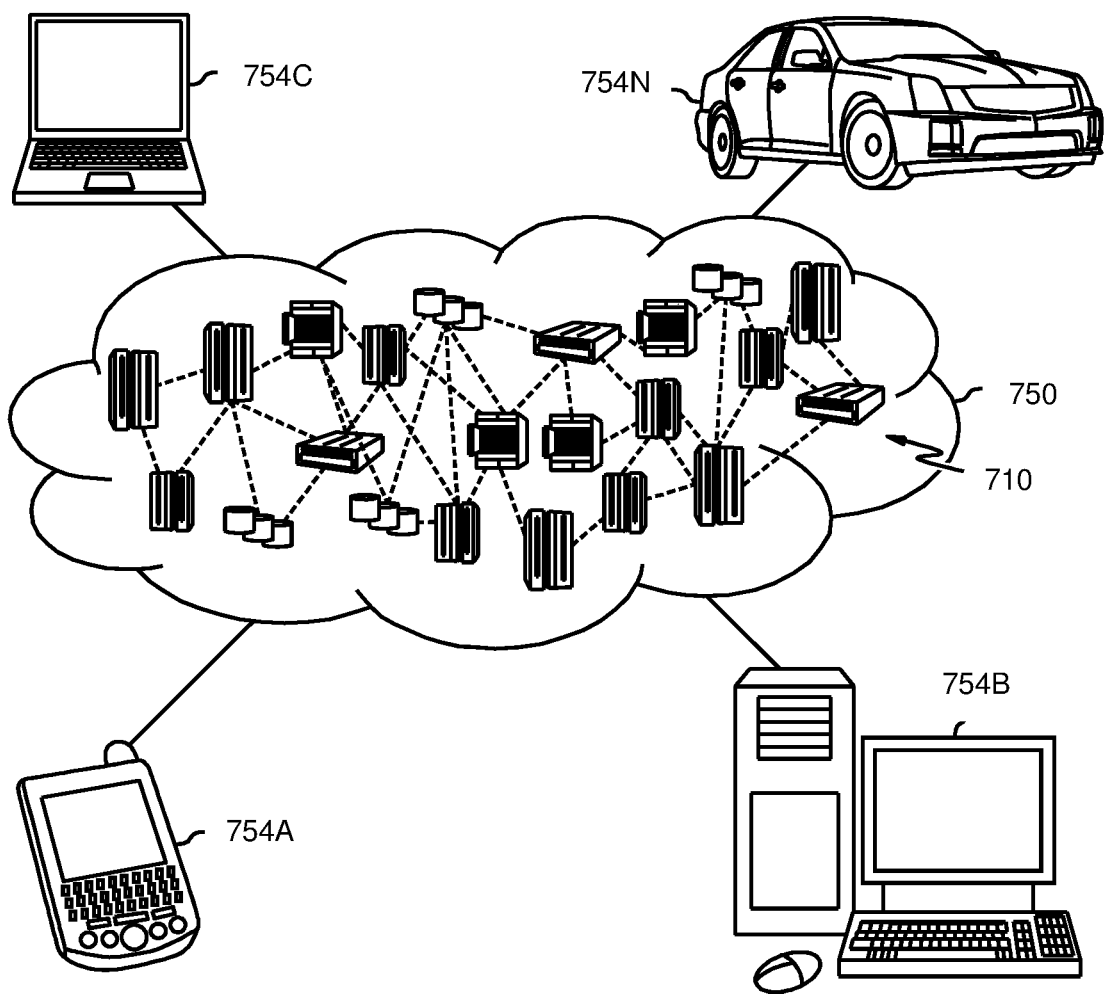
FIG. 7 is a schematic diagram of a cloud computing environment in which the present invention may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
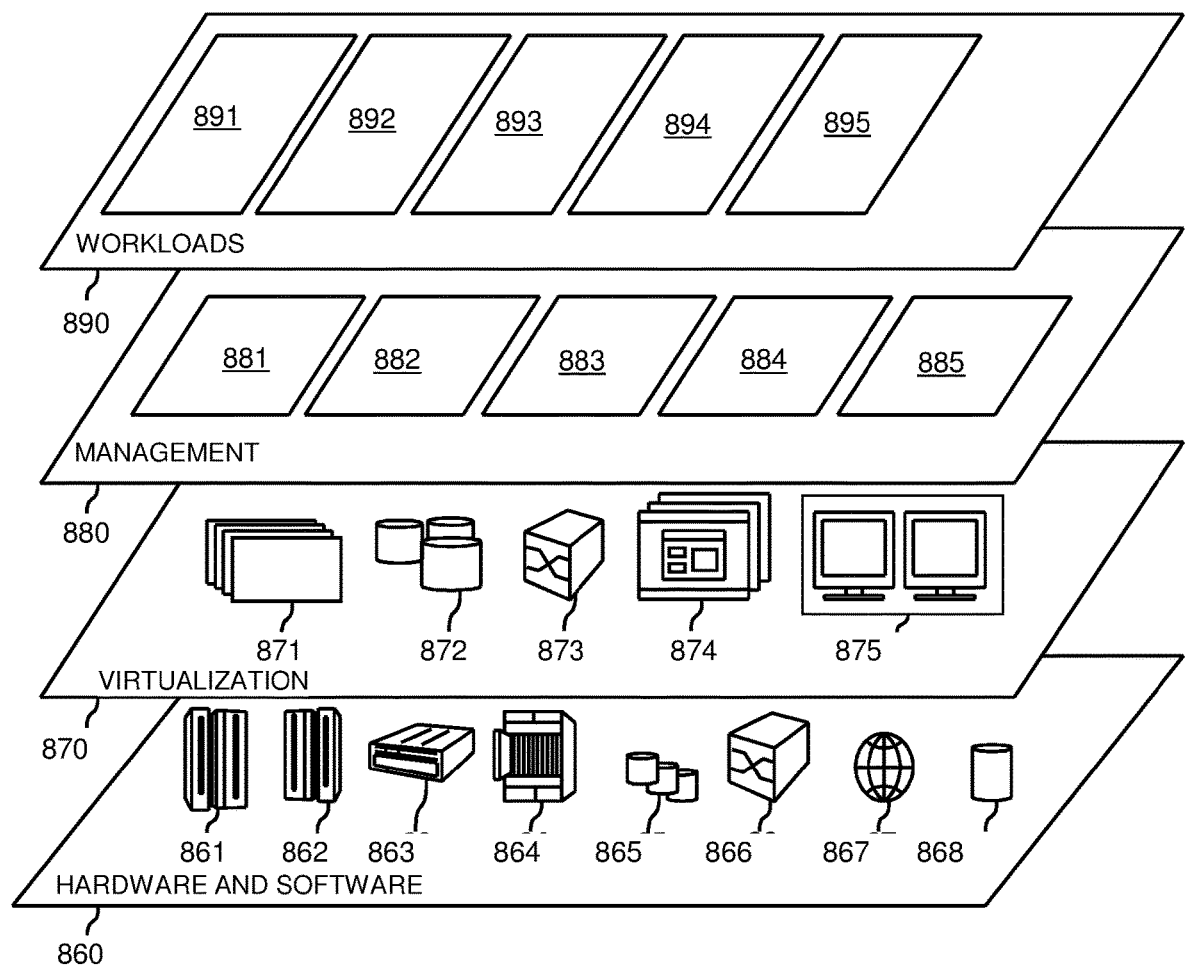
FIG. 8 is a diagram of abstraction model layers of a cloud computing environment in which the present invention may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and protecting in-flight transaction requests 895.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for protecting in-flight transaction requests, the method carried out at a backend computing server, comprising:
    by a processor of a backend server device capable of processing two or more identical redundant instances of a transaction request, originated by a client device, that are received via at least two application servers:
        receiving a first instance of the transaction request identified by a transaction identifier;
        processing the first instance of the transaction request and sending a transaction response to the client device;
        saving the transaction response identified by the transaction identifier in a cache; and
        if a subsequent instance of the transaction request identified by the transaction identifier that identified the first instance of the transaction request is received, sending the cached transaction response to the client device.

2. The computer-implemented method of claim 1, further comprising identifying the first instance of the transaction request by determining that the transaction identifier for the two or more identical redundant instances of the transaction request is not already referenced in the cache.

3. The computer-implemented method of claim 1, further comprising adding a reference comprising the transaction identifier of the first instance of the transaction request to the cache indicating that the first instance of the transaction request having the transaction identifier is currently being processed.

4. The computer-implemented method of claim 1, further comprising identifying the subsequent instance of the transaction request by determining that the transaction identifier for the subsequent transaction request is already referenced in the cache.

5. The computer-implemented method of claim 1, further comprising, after receiving the subsequent instance of the transaction request:
    determining whether the transaction identifier for the first instance of the transaction request is referenced in the cache and whether the transaction response is saved in the cache; and
    in response to determining that the transaction identifier for the first instance of the transaction request is referenced in the cache and that the transaction response is not saved in the cache, storing a reply indicator in the cache indicating that the cached transaction response is to be sent in reply to the subsequent instance of the transaction request in response to completion of processing of the first instance of the transaction request.

6. The computer-implemented method of claim 5, further comprising, in response to the completion of the processing of the first instance of the transaction request:
    determining whether the reply indicator associated with the transaction identifier of the first instance of the transaction request is stored in the cache; and
    in response to determining that the reply indicator associated with the transaction identifier of the first instance of the transaction request is stored in the cache, sending the cached transaction response in reply to the subsequent instance of the transaction request.

7. The computer-implemented method of claim 1, further comprising:
    deleting the transaction response from the cache in response to determining that a predefined time period has expired; and
    determining, in response to deleting the transaction response according to the expiration of the predefined time period, that the subsequent instance of the transaction request has not arrived indicating that at least one of the at least two application servers is down.

8. The computer-implemented method of claim 1, where the first instance of the transaction request further comprises an expiration time provided as metadata in the transaction request, and where processing the first instance of the transaction request comprises processing the first instance of the transaction request if the expiration time has not expired.

9. A computer readable storage medium storing instructions which, when executed on one or more programmed processors, carry out the method according to claim 1, where the computer readable storage medium is not a transitory signal per se.

10. A computer-implemented method for protecting in-flight transaction requests, the method carried out at a computing client comprising:
    by a processor of a client device connected via at least two application servers to a backend server device:
        sending two or more identical redundant instances of a transaction request, each comprising a same transaction identifier, with each instance of the transaction request being sent via a different one of the at least two application servers;
        receiving a first instance of a transaction response identified by the transaction identifier;
        saving the first instance of the transaction response identified by the transaction identifier or a record of the first instance of the transaction response identified by the transaction identifier in a cache; and
        if a subsequent instance of the transaction response is received, deleting the received subsequent instance of the transaction response.

11. The computer-implemented method of claim 10, further comprising, by the processor of the client device:

generating the two or more identical redundant instances of the transaction request, with each instance comprising the same transaction identifier and a same expiration time provided as metadata in the transaction request.

12. The computer-implemented method of claim 10, further comprising, by the processor of the client device:
deleting the saved first instance of the transaction response or the saved record of the first instance of the transaction response from the cache in response to expiration of a predefined time period; and
determining, in response to deleting the transaction response or the record according to the expiration of the predefined time period, that the subsequent instance of the transaction response has not arrived indicating that at least one of the at least two application servers is down.

13. The computer-implemented method of claim 10, where the processor of the client device sending the two or more identical redundant instances of the transaction request comprises the processor of the client device:
sending three or more redundant transaction request instances, where in the event that one of the at least two application servers fails during delivery of the three or more redundant transaction request instances to the backend server device, transaction responses are received from the backend server device for two or more of the three or more redundant transaction request instances to provide redundancy on transaction response delivery via the at least two application servers.

14. A system for protecting in-flight transaction requests at a backend computing server comprising:
a cache; and
a processor of a backend server device capable of processing two or more identical redundant instances of a transaction request, originated by a client device, that are received via at least two application servers, where the processor is programmed to:
receive a first instance of the transaction request identified by a transaction identifier;
process the first instance of the transaction request and send a transaction response to the client device;
save the transaction response identified by the transaction identifier in the cache; and
if a subsequent instance of the transaction request identified by the transaction identifier that identified the first instance of the transaction request is received, send the cached transaction response to the client device.

15. The system of claim 14, where the processor is further programmed to identify the first instance of the transaction request by determining that the transaction identifier for the two or more identical redundant instances of the transaction request is not already referenced in the cache.

16. The system of claim 14, where the processor is further programmed to add a reference comprising the transaction identifier of the first instance of the transaction request to the cache indicating that the first instance of the transaction request having the transaction identifier is currently being processed.

17. The system of claim 14, where the processor is further programmed to identify the subsequent instance of the transaction request by determining that the transaction identifier for the subsequent transaction request is already referenced in the cache.

18. The system of claim 14, where the processor is further programmed to, after receiving the subsequent instance of the transaction request:
determine whether the transaction identifier for the first instance of the transaction request is referenced in the cache and whether the transaction response is saved in the cache; and
in response to determining that the transaction identifier for the first instance of the transaction request is referenced in the cache and that the transaction response is not saved in the cache, store a reply indicator in the cache indicating that the cached transaction response is to be sent in reply to the subsequent instance of the transaction request in response to completion of processing of the first instance of the transaction request.

19. The system of claim 18, where the processor is further programmed to, in response to the completion of the processing of the first instance of the transaction request:
determine whether the reply indicator associated with the transaction identifier of the first instance of the transaction request is stored in the cache; and
in response to determining that the reply indicator associated with the transaction identifier of the first instance of the transaction request is stored in the cache, send the cached transaction response in reply to the subsequent instance of the transaction request.

20. The system of claim 14, where the processor is further programmed to:
delete the transaction response from the cache in response to determining that a predefined time period has expired; and
determine, in response to deleting the transaction response according to the expiration of the predefined time period, that the subsequent instance of the transaction request has not arrived indicating that at least one of the at least two application servers is down.

* * * * *